US011892613B2

United States Patent
Oron et al.

(10) Patent No.: US 11,892,613 B2
(45) Date of Patent: Feb. 6, 2024

(54) SYSTEM AND METHOD FOR GENERATING AN IMAGE

(71) Applicant: YEDA RESEARCH AND DEVELOPMENT CO. LTD., Rehovot (IL)

(72) Inventors: Dan Oron, Rehovot (IL); Uri Rossman, Rehovot (IL); Ron Tenne, Rehovot (IL); Yonina C. Eldar, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 198 days.

(21) Appl. No.: 17/624,344

(22) PCT Filed: Jul. 2, 2020

(86) PCT No.: PCT/IL2020/050744
§ 371 (c)(1),
(2) Date: Jan. 2, 2022

(87) PCT Pub. No.: WO2021/001836
PCT Pub. Date: Jan. 7, 2021

(65) Prior Publication Data
US 2022/0260819 A1 Aug. 18, 2022

Related U.S. Application Data

(60) Provisional application No. 62/870,697, filed on Jul. 4, 2019.

(51) Int. Cl.
*G02B 21/00* (2006.01)
*G01N 21/64* (2006.01)

(52) U.S. Cl.
CPC ....... *G02B 21/008* (2013.01); *G02B 21/0076* (2013.01); *G01N 21/6458* (2013.01)

(58) Field of Classification Search
CPC .............. G02B 21/008; G02B 21/0076; G01N 21/6458
(Continued)

(56) References Cited

U.S. PATENT DOCUMENTS

| 2008/0253642 | A1* | 10/2008 | Alexandrov | ............ G06T 5/003 |
| | | | | 382/133 |
| 2010/0278400 | A1* | 11/2010 | Piestun | .............. G01N 21/6456 |
| | | | | 359/368 |
| 2012/0155725 | A1* | 6/2012 | Bathe | .................... G06T 7/0016 |
| | | | | 382/128 |

FOREIGN PATENT DOCUMENTS

WO  WO 2020/201849  10/2020

OTHER PUBLICATIONS

Abbe E. "Beiträge zur Theorie des Mikroskops und der mikroskopischen Wahrnhmung" Archiv für mikroskopische Anatomie. Dec. 1873;9(1):413-68.
(Continued)

*Primary Examiner* — Sherrie Hsia
(74) *Attorney, Agent, or Firm* — Mark S. Cohen; PEARL COHEN ZEDEK LATZER BARATZ LLP

(57) ABSTRACT

A method of generating an image of a sample is provided. The method comprises providing a plurality of photon detectors, scanning the sample with an excitation beam over a predetermined time period, the detectors receiving photons emitted by the sample due to the excitation during the time period. A plurality of intensity images associated with each of the detectors are generated, each being proportional to the mean number of photons detected per unit time. A plurality of correlation images associated with each combination of two of the detectors are generated, each of the correlation
(Continued)

images being proportional to the variance of the distribution of detected photons per unit time. The image of the sample is generated using joint sparse recovery from the plurality of intensity and correlation images, wherein the intensity and correlation images have common support.

20 Claims, 10 Drawing Sheets

(58) Field of Classification Search
USPC .................. 348/80; 382/128, 133, 274, 276
See application file for complete search history.

(56) References Cited

OTHER PUBLICATIONS

Baraniuk et al. "Compressive radar imaging" IEEE Radar Conference.
Beck et al. "A fast iterative shrinkage-thresholding algorithm for linear inverse problems" SIAM journal on imaging sciences. 2009;2(1):183-202.
Berg et al. "Joint-sparse recovery from multiple measurements" arXiv preprint arViv:0904.2051. Apr. 14, 2009.
Betzig et al. "Imaging intracellular fluorescent proteins at nanometer resolution" Science Sep. 15, 2006;313(5793):1642-5.
Candes et al. "Near-optimal signal recovery from random projections: Universal encoding strategies?" IEEE transactions on information theory. Nov. 30, 2006;52(12):5406-25.
Chen et al. "Atomic decomposition by basis pursuit" SIAM review. 2001;43(1):129-59.
Chernyakova et al. "Fourier-domain beamforming: the path to compresses ultrasound images" IEEE transactions on ultrasonics, ferroelectrics, and frequency control. Jul. 26, 2014;61(8):1252-67.
Dertinger et al. "Fast, background-free, 3D super-resolution optical fluctuation imaging (SOFI)" Proceedings of the National Academy of Sciences. Dec. 29, 2009;106(52):22287-92.
Emmanuel et al. "Robust uncertaintly principles: Exact signal reconstruction from highly incomplete frequency information" 2004.
Figueiredo e al. "Gradient projection for sparse reconstruction: Application to compressed sensing and other inverse problems" IEEE Journal of selected topics in signal processing. Dec. 2007;1(4):586-97.
Gazit et al. "Super-resolution and reconstruction of sparse sub-wavelenght images" OPtics express. Dec. 21, 2009;17(26):23920-46.
Grußmayer et al. "Time-resolved molecule counting by photon statistics across the visible spectrum" Physical Chemistry Chemical Physics. 2017;19(13):8962-9.
Gustafsson MG. "Surpassing the lateral resolution limit by a factor of two using structured illumination miscroscopy" May 2000;198(2):82-7.
Heilemann et al. "Subdiffraction-resolution fluorescence imaging with conventional fluorescent probes" Angewandte Chemie International Edition. Aug. 4, 2008;47(33):6172-6.
Hell et al. "Breaking the diffraction resolution limit by stimulated emission: stimulated-emission-depletion fluorescence microscopy" Optics letters. Jun. 1, 1994;19(11):780-2.
International Search Report for PCT Application No. PCT/IL2020/050744 dated Oct. 2, 2020.
Israel et al. "Quantum correlation enhanced super-resolution localization microscopy enabled by a fibre bundle camera" Nature communications. Mar. 13, 2017;8(1):1-5.
Lustig et al. "Sparse MRI: The application of compressed sensing for rapid MR imaginig" Magnetic Resonance in Medicine: An Official Journal of the International Society for Magnetic Resonance in Medicine. Dec. 2007;58(6):1182-95.
Monticone et al. "Beating the Abbe diffraction limit in confocal microscopy via nonclassical photon statistics" Physical review letters. Sep. 30, 2014;113(14):143602.
Müller et al. "Image scanning microscopy" Physical review letters. May 10, 2010;104(19):198101.
Potter et al. "Sparsity and compressed sensing in radar imaging" Proceedings of the IEEE. Feb. 25, 2010;98(6):1006-20.
Rayleigh L. XV. "On the theory of optical images, with special reference to the microscope" The London, Edinburgh, and Dublin Philosophical Magazine and Journal of Science. Aug. 1, 1896;42(255):167-95.
Rossman et al. "Rapid quantum image scanning microscopy by joint sparse reconstruntion" Optica. Oct. 20, 2019;6(10):1290-6.
Rust et al. "Sub-diffraction-limit imaging by stochastic optical reconstruction microscopy (STORM)" Nature methods. Oct. 20063(10):793-6.
Schwartz et al. "Superresolution microscopy with quantum emitters" Nano letters. Dec. 11, 2013;13(12):5832-6.
Schwartz et al. "Improved resolution in fluorescence microscopy using quantum correlations" Physical Review A. Mar. 16, 2012;85(3):033812.
Shechtman et al. "Super-resolution and reconstruction of sparse images carried by incoherent light" Optics letters. Apr. 15, 2010;35(6):1148-50.
Sheppard CR. "Super-resolution in confocal imaging" Optik (Stuttgart). 1988;80(2):53-4.
Solomon et al. "Sparsity-based super-resolution microscopy from correlation information" Optics express. Jul. 9, 2018;26(14):18238-69.
Song et al. "Multimodal image super-resolution via joint sparse representations induced by coupled dictionaries" IEEE Transactions on Computational Imaging. May 15, 2019;6:57-72.
Szamet et al. "Sparsity-based single-shot subwavelength coherent diffractive imaging" Nature materials. May 2012;11(5):455-9.
Ta et al. "Mapping moleculues in scanning far-field fluorescence nanoscopy" Nature communications. Aug. 13, 2015;6(1):1-7.
Tenne et al. "Super-resolution enhancement by quantum image scanning microscopy" Nature Photonics. Feb. 2019;13(2):116-22.
Tenne et al. "Quantum image scanning microscopy: concept and considerations towards applicability" In Optical, Opto-Atomic, and Entanglement-Enhanced Precision Metrology Mar. 1 2019 (vol. 10934, p. 109341P). International Society for Optics and Photonics.
Tibshirani R. "Regression shrinkage and selection via the lasso" Journal of the Royal Statistical Society: Series B (Methodological). Jan. 1996;58(1):267-88.
Tropp JA. "Just relax: Convex programming methods for identifying sparse signals in noise" IEEE transactions on information theory. Mar. 6, 2006;52(3):1030-51.
Wagner et al. "Compressed beamforming in ultrasound imaging" IEEE Transactions on Signal Processing. May 22, 2012;60(9):4643-57.
Yang et al. "Image super-resolution via sparse representation" IEEE transactions on image processing. May 18, 2010;19(11):2861-73.

* cited by examiner

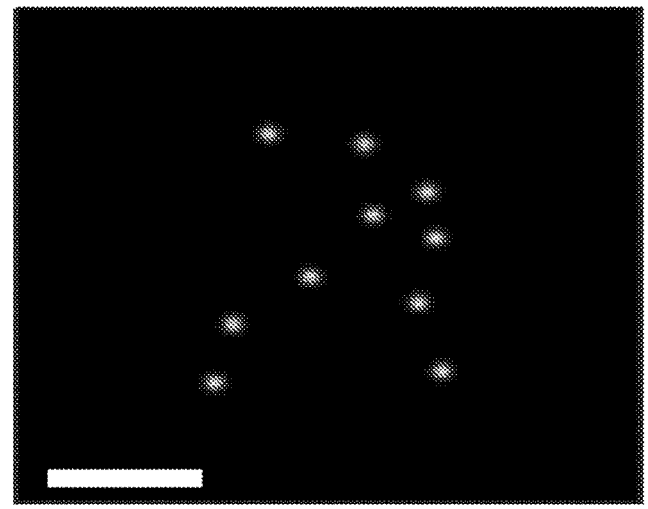
Fig. 2A
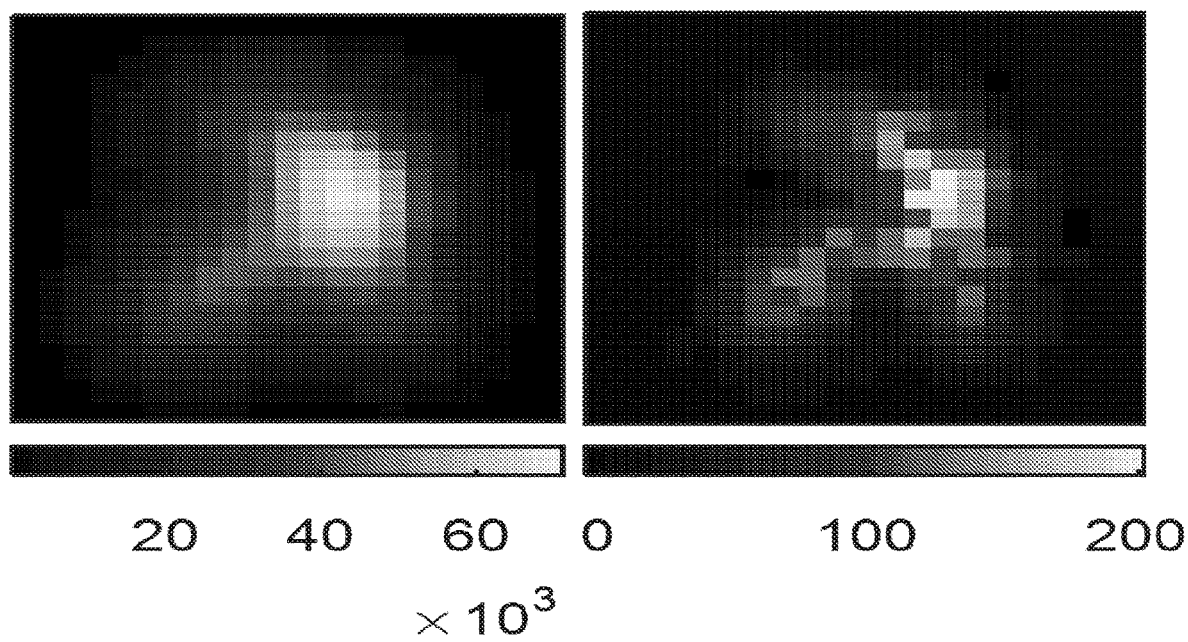
Fig. 2B
Fig. 2C

SYSTEM AND METHOD FOR GENERATING AN IMAGE

CROSS-REFERENCE TO RELATED APPLICATIONS

This application is a National Phase Application of PCT International Application No. PCT/IL2020/050744, International Filing Date Jul. 2, 2020, claiming the benefit of U.S. Provisional Application No. 62/870,697, filed Jul. 4, 2019, which are hereby incorporated by reference.

FIELD OF THE INVENTION

The presently disclosed subject matter relates to analysis of independent images detailing a similar scene via different contrast mechanisms, and specifically to image scanning microscopy. More particularly, the presently disclosed subject matter relates to systems and methods for rapid quantum image scanning microscopy.

BACKGROUND

Modern imaging techniques have managed to exceed the classical resolution limit for imaging, wherein the diffraction limit of light imposes a restriction on the resolution attainable by classical microscopy. Contemporary super resolution methods, such as localization, stimulated emission depletion, and structured illumination and fluctuation microscopy, overcome this limitation, enabling the recovery of subwavelength features. Image scanning microscopy (ISM) is an additional established imaging technique, which may achieve a two-fold enhancement in resolution. ISM is based on an array of collectors, where each pixel acts as a small pinhole in a confocal scanning laser microscope. Therefore, ISM provides resolution up to twice that of the diffraction limit, without compromising the collected signal level.

Recently introduced, quantum image scanning microscopy (Q-ISM) takes advantage of the quantum optical effect of photon antibunching with a standard ISM architecture. Q-ISM has successfully harnessed quantum correlations of light to establish an improved viable imaging modality that builds upon the earlier ISM resolution method.

SUMMARY

According to an aspect of the presently disclosed subject matter, there is provided a method of generating an image of a sample, for example exhibiting non-Poissonian emission statistics, the method comprising:
  providing a plurality of photon detectors;
  scanning the sample with an excitation beam over a pre-determined time period;
  receiving, by the detectors, photons emitted by the sample due to the excitation during the time period;
  generating a plurality of intensity images associated with each of the detectors, each of the intensity images being proportional to the mean number of photons detected per unit time;
  generating a plurality of correlation images associated with each combination of two of the detectors, each of the correlation images being proportional to the variance of the distribution of detected photons per unit time; and
  generating the image of the sample using joint sparse recovery from the plurality of intensity and correlation images, wherein the intensity and correlation images have common support.

The joint sparse recovery may comprise determining a solution to:

$$\min_{x'_i, x''_j} \left\{ \sum_{i=1}^{U} \|A'_i x'_i - y'_i\|_2^2 + \sum_{j=1}^{V} \eta \|A''_j x''_j - y''_j\|_2^2 + \lambda \|\hat{X}\|_{2,1} \right\},$$

wherein:
  U is the number of intensity images;
  V is the number of correlation images;
  $A'_i$ is the sensing matrix of each detector;
  $A''_j$ is the sensing matrix of each of the pairs of detectors;
  $x'_i$ is a vector of the signal, for example a latent signal, of each of the intensity images;
  $x''_j$ is a vector of the signal, for example a latent signal, of each of the correlation images;
  $y'_i$ is the measurement vector associated with each of the intensity images;
  $y''_j$ is the measurement vector associated with each of the correlation images;
  $\hat{X}$ is a matrix constituted by stacking all of the x' and x" vectors (e.g., each of the vectors constitutes a column in the matrix $\hat{X}$);
  $\eta$ is a weighting factor;
  $\|\cdot\|_2$ denotes the $\ell_2$ norm;
  $\|\cdot\|_{2,1}$ denotes the $\ell_{2,1}$ mixed norm to promote sparsity; and
  $\lambda$ is a regularization parameter of the $\ell_{2,1}$ norm.

The Method May Further Comprise:
  generating an intermediate intensity image from the plurality of intensity images; and
  generating an intermediate correlation image from the plurality of correlation images; wherein the joint sparse recovery is performed using the intermediate intensity image and the intermediate correlation image.

The method may comprise generating an intermediate intensity image from the plurality of intensity images, and performing the joint sparse recovery using the intermediate intensity image and the plurality of correlation images.

The method may comprise generating an intermediate correlation image from the plurality of correlation images, and performing the joint sparse recovery using the intermediate correlation image and the plurality of intensity images.

One or both of the intermediate intensity image and intermediate correlation image may be generated using pixel reassignment.

One or both of the intermediate intensity image and intermediate correlation image may be generated using sparse recovery.

Generating each of the correlation images may comprises determining the difference between the number of pairs of photons detected by the two detectors at a non-zero, finite delay and the number of pairs of photons detected by the two detectors at a zero delay.

The sample may exhibit quantum intensity fluctuations. The quantum intensity fluctuations may comprise photon antibunching.

The sample may exhibit classical (i.e., non-quantum) intensity fluctuations.

The number of intensity images may be equal to the number of detectors. The number of correlation images may be equal to the number of combinations of pairs of detectors.

According to another aspect of the presently disclosed subject matter, there is provided a system for generating an image of a sample, for example exhibiting non-Poissonian emission statistics, the system comprising:
- a light source configured to scan the sample with an excitation source;
- a collection array comprising a plurality of photon collectors each configured to receive one or more photons emitted by the sample due to excitation by the excitation source;
- a detector assembly comprising a plurality of detectors each corresponding to one of the photon collectors, the detector assembly being configured to measure the arrival time of the collected photons; and
- a computing device configured to:
  - generate a plurality of intensity images associated with each of the detectors, each of the intensity images being proportional to the mean number of photons detected per unit time;
  - generate a plurality of correlation images associated with each combination of two of the detectors, each of the correlation images being proportional to the variance of the distribution of detected photons per unit time; and
  - generating the image of the sample using joint sparse recovery from the plurality of intensity and correlation images, wherein the intensity and correlation images have common support.

The detector assembly may comprise a single photon avalanche detector array and a time correlated single photon counting card in communication with the single photon avalanche detector array.

The system may further comprise a dichroic mirror and at least one lens.

The collection array may comprise a bundle of fiber-optic cables.

The joint sparse recovery may comprise determining a solution to:

$$\min_{x'_i, x''_j} \left\{ \sum_{i=1}^{U} \|A'_i x'_i - y'_i\|_2^2 + \sum_{j=1}^{V} \eta \|A''_j x''_j - y''_j\|_2^2 + \lambda \|\hat{X}\|_{2,1} \right\},$$

wherein:
- U is the number of intensity images;
- V is the number of correlation images;
- $A'_i$ is the sensing matrix of each detector;
- $A''_j$ is the sensing matrix of each of the pairs of detectors;
- $x'_i$ is a vector of the signal, for example a latent signal, of each of the intensity images;
- $x''_j$ is a vector of the signal, for example a latent signal, of each of the correlation images;
- $y'_i$ is the measurement vector associated with each of the intensity images;
- $y''_j$ is the measurement vector associated with each of the correlation images;
- $\hat{X}$ is a matrix constituted by stacking all of the x' and x" vectors (e.g., each of the vectors constitutes a column in the matrix $\hat{X}$);
- $\eta$ is a weighting factor;
- $\|\cdot\|_2$ denotes the $\ell_2$ norm;
- $\|\cdot\|_{2,1}$ denotes the $\ell_{2,1}$ mixed norm to promote sparsity; and
- $\lambda$ is a regularization parameter of the $\ell_{2,1}$ norm.

The computing device may be further configured to:
- generate an intermediate intensity image using sparse recovery from the plurality of intensity images; and
- generate an intermediate correlation image using sparse recovery from the plurality of correlation images;
- wherein the joint sparse recovery is performed using the intermediate intensity image and the intermediate correlation image.

The computing device may be configured to generate an intermediate intensity image from the plurality of intensity images, and performing the joint sparse recovery using the intermediate intensity image and the plurality of correlation images.

The computing device may be configured to generate an intermediate correlation image from the plurality of correlation images, and performing the joint sparse recovery using the intermediate correlation image and the plurality of intensity images.

One or both of the intermediate intensity image and intermediate correlation image may be generated using pixel reassignment.

One or both of the intermediate intensity image and intermediate correlation image may be generated using sparse recovery.

Generating each of the correlation images may comprises determining the difference between the number of pairs of photons detected by the two detectors at a non-zero, finite delay and the number of pairs of photons detected by the two detectors at a zero delay.

The sample may exhibit quantum intensity fluctuations. The quantum intensity fluctuations may comprise photon antibunching.

The sample may exhibit classical (i.e., non-quantum) intensity fluctuations.

The number of intensity images may be equal to the number of detectors. The number of correlation images may be equal to the number of combinations of pairs of detectors.

BRIEF DESCRIPTION OF THE DRAWINGS

The presently disclosed subject matter is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 2A through 2K show simulation results for ISM Q-ISM and JSR images, according to some embodiments of the presently disclosed subject matter;

Figure 1A:
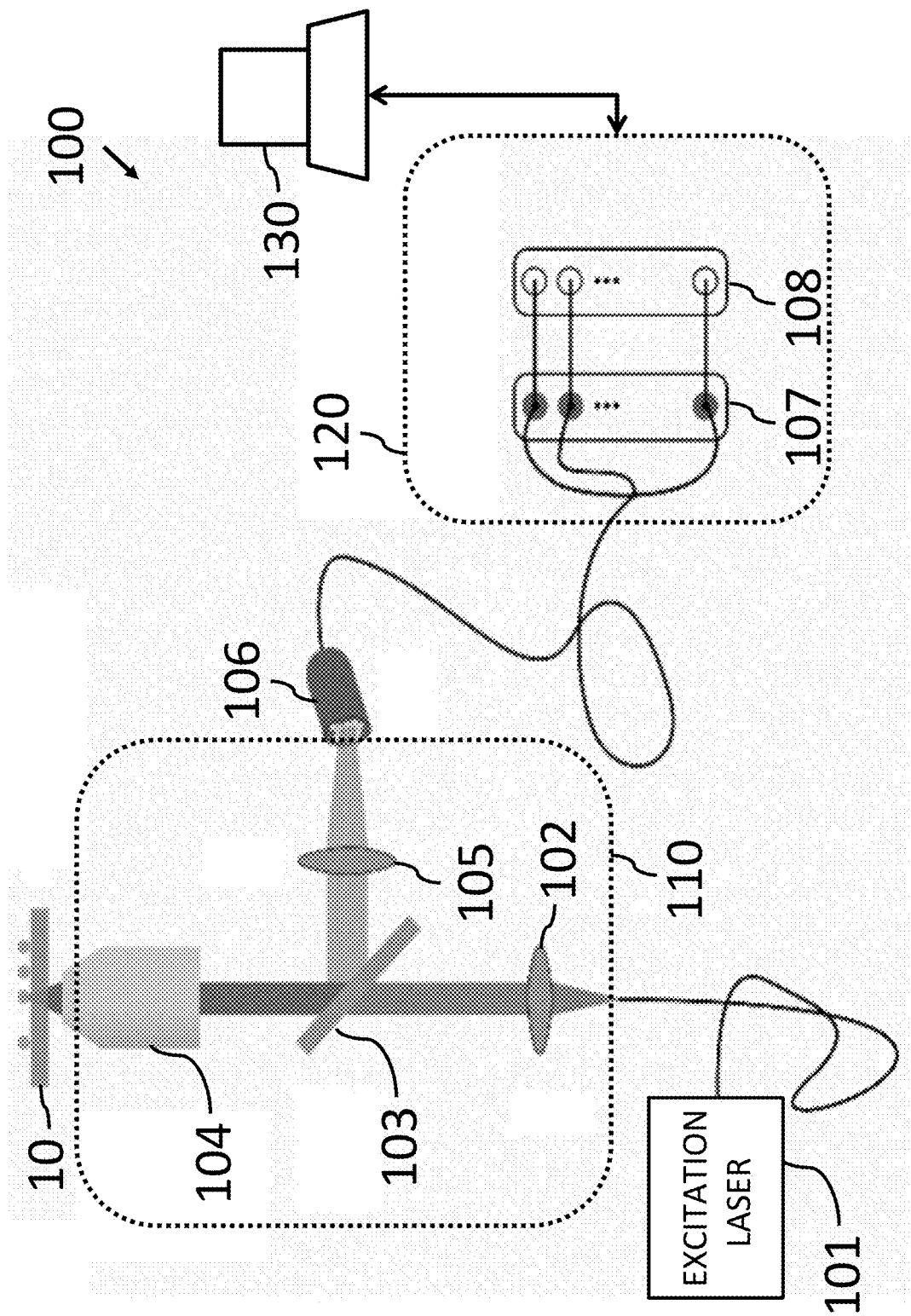
FIG. 1A schematically illustrates a system for generation and synthesis of ISM and Q-ISM, according to some embodiments of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

Although embodiments of the presently disclosed subject matter are not limited in this regard, discussions utilizing terms such as, for example, "processing," "computing," "calculating," "determining," "establishing," "analyzing," "checking," or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the presently disclosed subject matter are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1A which schematically illustrates a system 100 for generation and synthesis of ISM and Q-ISM, according to some embodiments of the presently disclosed subject matter. For Q-ISM imaging, a modified confocal microscope architecture may be utilized, in which a standard pixelated detector may be replaced by an array of fast single-photon sensitive collectors. During a measurement, a sample labeled by single photon emitters, may be raster scanned (e.g., with a rectangular line by line scanning pattern) through a diffraction-limited focused laser beam.

Using the system 100, a light beam with excitation light may be emitted from an excitation laser 101 towards the sample 10, via an optical microscope 110 to image fluorescent samples in a confocal mode. The light emitted from the excitation laser 101 may pass through a first lens 102, a dichroic mirror 103 and an objective lens 104. The sample may be illuminated, for instance with a 515 nm pulsed picosecond laser diode coupled to a single-mode fiber and focused through a 1.4 numerical aperture objective lens 104 into a stationary point spread function. A two-axis piezo stage may scan the sample row-by-row as it is illuminated. The fluorescence may be collected by the same objective lens 104 and filtered with the dichroic mirror 103 and/or filters.

The epi-detected light (e.g., fluorescent light) may pass the dichroic mirror 103 towards a second lens 105. Thus, the light beam may be separated from the excitation light and imaged upon a fiber bundle collection array 106. The collection array 106 may include a plurality of optical fibers in a bundle formation, for instance having the facet of each of them being smaller than the diffraction limited spot size in the imaging plane, and each configured to receive a single photon. A pinhole in a confocal microscope may be replaced by the fiber bundle collection array 106 to guide impinging light to at least one single photon avalanche detector (SPAD) 107. For example, the fiber bundle 106 may spread out to distinctive fibers which guide the light to a plurality of SPADs 107, e.g., one corresponding to each of the optical fibers.

A Galilean beam expander may be placed following the relay lens 105 to magnify the imaged fluorescence spot on to the fiber bundle collection array 106. This fiber bundle collection array may include multimode 100/110 μm core/clad fibers, for instance fused together on the entrance side. On the exit side, the fibers 106 may fan-out to individual multimode fibers. In some embodiments, these fibers guide light from the image plane to individual SPADs 107.

Each one of the SPADs 107 may be connected to a corresponding time correlated single photon counting (TCSPC) card 108 to time stamp the incoming photons, for instance with sub-nanosecond temporal resolution. In some embodiments, the at least one TCSPC card 108 may be used for data acquisition in (absolute) timing mode, for instance with an excitation pulse trigger synchronized and recorded at a rate of 0.5 MHz.

In some embodiments, the light beam at the end of the microscope 110 may be received at a detector assembly 120 including multiple single photon detectors 107 and a timing and correlation element 108 (e.g., a TCSPC card). In some embodiments the detector assembly may include a monolithic SPAD array device. The data from the detector assembly 120 may be stored at and/or analyzed by a computing device 130.

The computing device 130 may be any suitable device for storing and/or analyzing the data from the detector assembly 120. Accordingly, it may comprise some or all of a bus, a processor, a memory, a storage arrangement, an input arrangement, an output arrangement, and a communication interface.

The bus may comprise one or more elements which facilitate communication among the components of computing device 130.

The processor may be implemented in hardware, firmware, or a combination of hardware and software. It may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another suitable processing component. According to some examples, the processor comprises one or more processors capable of being programmed to perform a function.

The memory may comprise a random access memory (RAM), a read only memory (ROM), and/or another type of dynamic or static storage device (e.g., a flash memory, a magnetic memory, and/or an optical memory) that stores information and/or instructions for use by the processor.

The storage arrangement is configured to store information and/or software related to the operation and use of the computing device 130. For example, it may comprise a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another suitable type of non-transitory computer-readable medium, for example along with a corresponding drive.

The input arrangement is configured to facilitate receipt of information by the computing device 130 from an external source, such as via user input (e.g., a touch screen display, a keyboard, a keypad, a mouse, a button, a switch, and/or a microphone). Additionally or alternatively, the input arrangement may comprise a sensor for sensing information (e.g., a global positioning system (GPS) component, an accelerometer, a gyroscope, and/or an actuator) and/or a camera for capturing an image of an object.

The output arrangement is configured to facilitate providing output information from the computing device 130 (e.g., a display, a speaker, and/or one or more light-emitting diodes).

The communication interface is configured to facilitate the computing device 130 receiving information from another device and/or providing information to another device. Accordingly, it may comprise includes a transceiver-like component (e.g., a transceiver and/or a separate receiver and transmitter) configured to communicate over a wired connection, a wireless connection, or a combination of wired and wireless connections. It may comprise an Ethernet interface, an optical interface, a coaxial interface, an infrared interface, a radio frequency (RF) interface, a universal serial bus (USB) interface, a Wi-Fi interface, a cellular network interface, and/or any other suitable interface.

The computing device 130 may perform one or more processes described herein. It may perform these processes based on the processor executing software instructions stored by a non-transitory computer-readable medium, such as the memory and/or the storage arrangement. A computer-readable medium may comprise a non-transitory memory device. A memory device may comprise memory space within a single physical storage device or memory spaces spread across multiple physical storage devices.

Software instructions may be read into the memory and/or the storage arrangement from another computer-readable medium or from another device via communication interface. When executed, the software instructions stored in memory and/or storage arrangement may cause the processor to perform one or more processes described herein. Additionally or alternatively, hardwired circuitry may be used in place of or in combination with software instructions to perform one or more processes described herein. Thus, implementations described herein are not limited to any specific combination of hardware circuitry and software.

The number and arrangement of components of the computing device 130 described above are provided as an example only. In practice, the computing device 130 may comprise additional components, fewer components, different components, or the same components in an arrangement that differs from that described above. Additionally or alternatively, a set of components (e.g., one or more components) of the computing device 130 may perform one or more of the functions described as being performed by another set of components of the computing device.

The computing device 130 is configured to generate images from the data obtained by the detector assembly 120. For example, it may construct a plurality of intensity images, each corresponding to one of the detector positions, in which the intensity of the image is proportional to the mean number of photons detected per a unit time by the corresponding detector. Such intensity images may be used to produce an ISM image, for example as is known in the art. It will be appreciated that U intensity images may be produced, wherein U is the number of detectors.

The computing device 130 may be further configured to generate a plurality of correlation images, which is based on photon detections by a pair of the detectors. During scanning, the timing and correlation element 108 determines when the pair of detectors detects a pair of photons, i.e., when each detects a single photon. The number of photon pairs which are detected simultaneously, i.e., with a zero-length delay between detections, is subtracted from the number of photon pairs which are detected at a delay, i.e., with a finite (i.e., non-zero) delay between detections. This difference per a unit time corresponds to the variance of the distribution of emitted photons. It will be appreciated that V correlation images may be produced, wherein V is the number of combinations of pairs of detectors, given by $[(U^2-U)/2]$.

It will be appreciated that the intensity and correlation images are generated from the same detector data. Accordingly, they share a common support, i.e., the locations of the non-zero positions are the same for both sets of images.

The computing device 130 may be configured, e.g., to generate an ISM image of the sample 10 based on the intensity images, and to generate a Q-ISM image of the sample based on the correlation images. According to some examples, the computing device 130 is configured to provide instructions to the microscope 110, directing it to perform a scanning operation of the sample 10.

Since each fiber of the fiber bundle collection array 106 is very small compared to the imaging point spread function (PSF) of the system 100, the scan of the sample 10 through the tightly focused beam may yield a confocal image with improved lateral resolution. Accordingly, a single photon detection event may become associated both with the absorption and detection of one photon, and as a result the effective PSF may turn into a product of the laser excitation profile and the detection PSF.

Figure 1B:
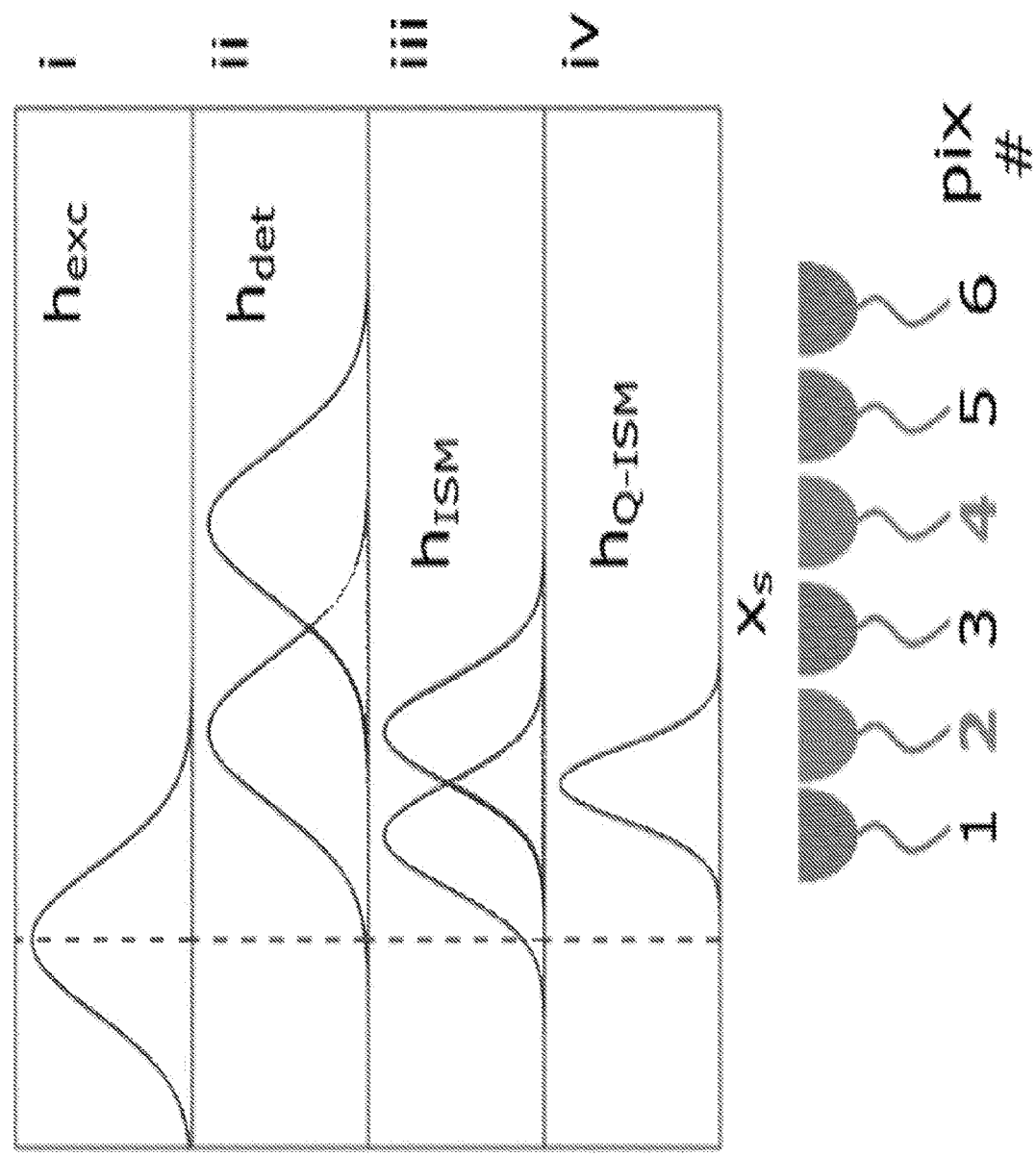
FIG. 1B schematically illustrates a graph of resolution improvement in ISM and Q-ISM, according to some embodiments of the presently disclosed subject matter.

Reference is made to FIG. 1B which schematically illustrates a graph of resolution improvement in ISM and Q-ISM, according to some embodiments of the presently disclosed subject matter. In FIG. 1B, the X axis is spatial position of the collector, as a one-dimensional schematic of the real two-dimensional collector.

The graph shown in FIG. 1B includes a first section (i) with a laser excitation profile and a second section (ii) with a detection probability distribution $h_{det}$ for two SPAD detectors. A third section (iii) includes an ISM point spread function $h_{ISM}$ for each SPAD detector as the product of its detection distribution, and the excitation profile. A fourth section (iv) includes an effective Q-ISM point spread function $h_{QISM}$ as the product of the two ISM point spread functions of the two detectors. For simplicity, one-dimensional illustrations are used with the approximation of the point spread functions to be Gaussian.

The summation of individual images from the detectors may be termed "pixel reassignment," and address the fact that different detectors record laterally shifted versions of the same image. Thus, the ISM technique may enhance the resolution of the native microscope by initially a factor of $\sqrt{2}$, without suffering the penalty of signal level reduction.

As for Q-ISM images, these images may depend on measuring antibunching of the fluorescent light, to improve resolution. In this scheme, pairs of fibers may constitute a "Hanbury-Brown Twiss" coincidence detection measurement, rather than counting the total number of photons. The fact that a particle cannot emit more than one photon at a time causes the photons to be anti-bunched. In some embodiments, anti-bunching may cause a reduction of simultaneous photon pairs compared to photon pairs separated by times longer than the fluorescence lifetime. Q-ISM imaging uses these missing photon pair events, that involve absorption and emission of two photons, as the imaging contrast. Therefore, the effective Q-ISM PSF may be further narrowed and veritably proportional to the excitation PSF squared and to the second power of the detection PSF, implying a two-fold finer resolution than the diffraction limit. Similar to ISM imaging, application of pixel reassignment may lead to proper summation of signal from all detector pairs.

By digitally amplifying the high spatial frequency content, for example using Fourier reweighting, an image with up to two-fold resolution enhancement may be achieved. By performing the Fourier reweighting, the resolution of the image could be increased by up to four-fold with respect to the diffraction limit, and up to two-fold relative to ISM. The use of an ultrafast camera or other imager, with temporal resolution smaller than the fluorescence lifetime of the quantum emitters may facilitate the rapid measurement of the anti-bunching signal.

It should be noted that since in far-field microscopy the probability to detect a single photon per emitter per pulse is much less than unity, missing events of two-photon detection may therefore be rare. As a result, the acquisition time frame required for a high signal to noise ratio (SNR) Q-ISM may be appreciably longer than that for an ISM image, thus posing a main limitation on Q-ISM in terms of a severe tradeoff between SNR and acquisition time. In some embodiments, relatively long acquisition times, for instance in the order of tens of milliseconds per a scan step, may be required to produce a sensible Q-ISM image, superior to the ISM one.

According to some embodiments, a joint sparse recovery (JSR) algorithm may be utilized to fuse the complementary ISM and Q-ISM images. In the following description, simulation results of the JSR processing as well as experimental results (taken with the system 100) are shown in which a restorated super-resolved optical image with improved resolution is correlated with a "ground truth" (or reference) image taken with an electron microscope.

Sparsity based signal recovery has become a useful tool in many applications, for instance radar, ultrasound, magnetic resonance imaging, and recently found its way into the field of super resolution imaging. Generally, an image of size M×M pixels may be mathematically modeled by a discrete linear system Ax=y+n. The matrix $A_{M^2 \times N^2}$ is a known sensing operator, which in the case of an imaging system whose point spread function (PSF) is spatially invariant, simply represents a two-dimensional convolution with that PSF. The vector $y_{M^2 \times 1}$ is the measured blurred image, $\eta$ is an unknown noise or perturbation, and $x_{N^2 \times 1}$ stands for the unknown true image whose size does not necessarily equal that of y, where x is the signal that underlies the inevitable degradation which accompanies the image acquisition process. Both x and y may be constructed by stacking the columns of their respective two-dimensional images. A prominent approach to solve the inverse problem of estimating the true signal is based on using prior information regarding the sparsity of the signal. This means that in some basis representation, the signal has only a small percentage of non-zero elements. Sparsity optimization has become a dominant tool in the field of compressed sensing, which may be used to reduce sampling below the Nyquist rate of the signal.

In the context of super resolution imaging, compressed sensing may be aimed to recover information contained in spatial frequencies that were cut off by low pass filtering of the diffraction limit. Therefore, in the reconstruction process of the signal, the data error alongside the enforcement of a sparse solution should be minimized. The single measurement vector (SMV) recovery may then be formulated as seeking the solution of the convex problem:

$$\min_{x} \{\|Ax - y\|_2^2 + \lambda \|x\|_1\} \quad \text{Eq. (1)}$$

where $\|\cdot\|_2$ denotes the $\ell_2$ norm, $\|\cdot\|_1$ denotes the $\ell_1$ norm, $\lambda$ is a $\ell_1$ regularization parameter having a value greater to or equal to zero. The first term enforces data consistency, while the second term promotes sparsity.

A generic variation to the SMV problem in Eq. (1) is the multiple measurement vector (MMV) problem. In this case a set of measurements and unknown signals, $y_{(k)}$ and $x_{(k)}$ respectively, in which the vectors $x_{(k)}$ are jointly sparse, i.e., they have non-zero entries in the same locations, should be calculated.

Figure 1C:
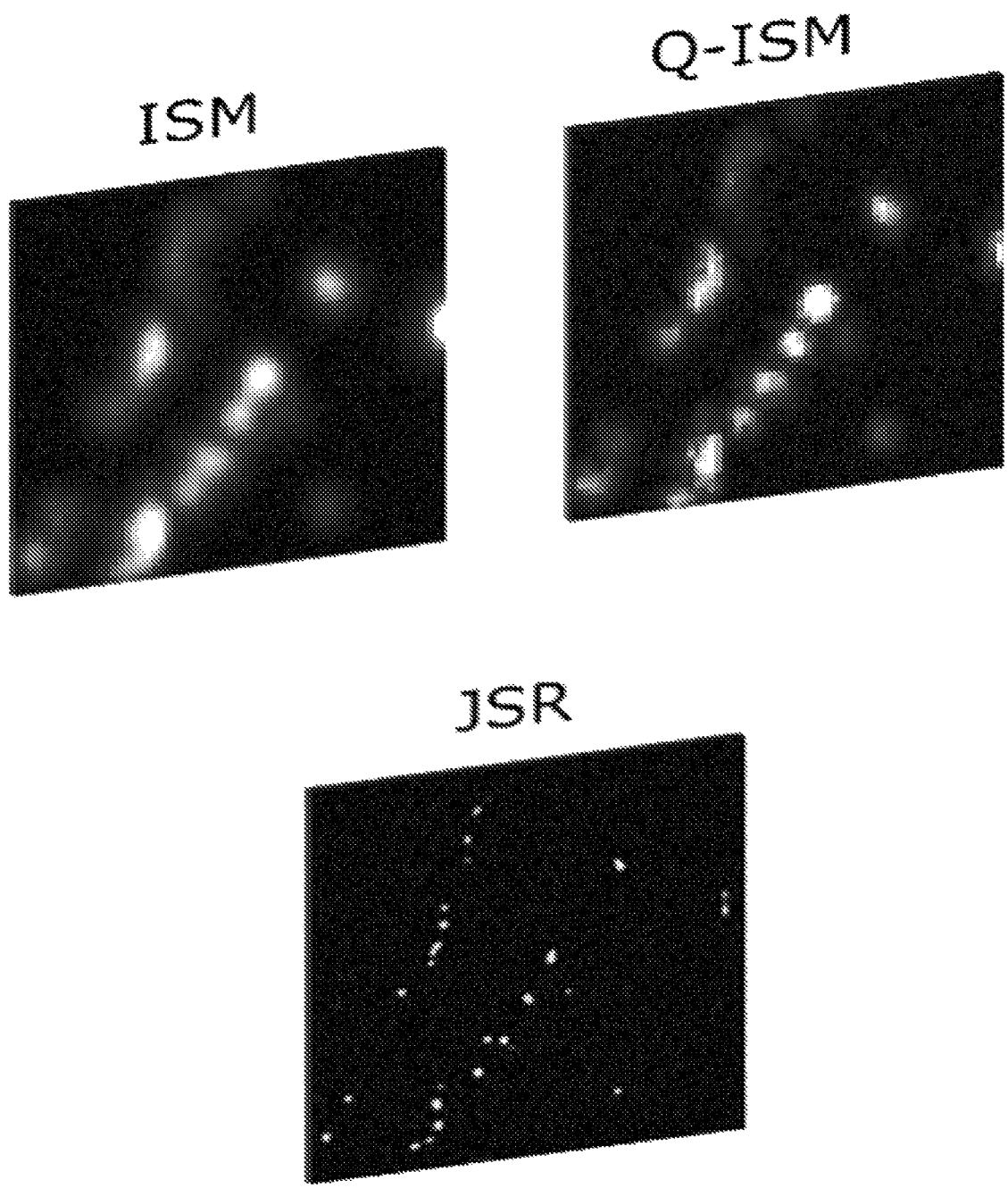
FIG. 1C shows ISM and Q-ISM images which are integrated to generate a joint sparse reconstruction (JSR) image, according to some embodiments of the presently disclosed subject matter.

Reference is made to FIG. 1C which shows ISM and Q-ISM images which are integrated to generate a joint sparse reconstruction (JSR) image, according to some embodiments of the presently disclosed subject matter. The combination of the "blurry" ISM image with the "sharp" Q-ISM image using the JSR algorithm to yield the recovered estimated position and density of the emitters (shown in the JSR image).

Q-ISM imaging may deliver two independent variants with complementary properties from the same scan. The ISM image features low resolution but a high SNR, whereas the quantum enhanced image may have a higher resolution (albeit being noisier). By incorporating the information from both images, a better characterization of the density and locations of the emitters may be obtained.

Even though the contrast mechanisms of the two images are not the same, the collected light originated from the same emitters. In other words, both images share a common support of the signal. Therefore, a joint sparse recovery (JSR) algorithm may be employed to achieve superior reconstruction results, for example being better than a sparse recovery from any of the individual images alone. The optimization problem may be formulated in the following form:

$$\min_{x_1, x_2} \{\|A_1 x_1 - y_1\|_2^2 + \eta \|A_2 x_2 - y_2\|_2^2 + \lambda \|X\|_{2,1}\} \quad \text{Eq. (2)}$$

constrained that $x_1$ and $x_2$ share the same support, namely the locations of the non-zero elements. Here, $A_i$ are the sensing matrices, $x_i$ are the unknown signals, $y_i$ are the measurement vectors, where the subscript i=1, 2 denotes the two different images. The matrix X is formed by stacking vectors $x_1$ and $x_2$ into the columns of a matrix. The mixed norm $\ell_{2,1}$, e.g., defined by $\|X\|_{2,1} = \Sigma_i \|x^i\|_2$, with $x^i$ denoting the $i^{th}$ row of the matrix X, to promote row-sparsity of X. Accordingly, the mixed norm promotes the joint sparse support of the vectors $x_1$ and $x_2$, which constitute X. The parameter $\eta$ is a scalar that controls the relative contribution of the two images to the data fidelity terms, and $\lambda$ is the $\ell_{2,1}$ regularization parameter. Features smaller than the pixel size in the original image may be recovered by setting the recovered grid to be denser than the grid of the captured image. According to the notation above, this may be translated to setting N>M. In some embodiments, the parameters η and λ may be determined and/or adjusted empirically.

Due to efficiency considerations, minimization problem may be solved in the discrete Fourier domain, and Eq. (2) may be iteratively solved using the fast iterative shrinkage-thresholding algorithm (FISTA) approach.

Reference is made to FIGS. 2A through 2K which show simulation results for ISM, Q-ISM, and JSR images, according to some embodiments of the presently disclosed subject matter. In some embodiments, simulation of the images may be generated with emulations of "shot-noise" limited ISM and/or Q-ISM images from a known scene of emitters (e.g., excitation lasers).

FIG. 2A shows a "ground truth" (or reference image) for these scans with single photon emitters, smoothened with a narrow Gaussian point spread function. Two data sets were created, different by an order of magnitude in integration time, which show a considerable modification of the quality of the Q-ISM images.

Figure 2D:
Figure 2E:
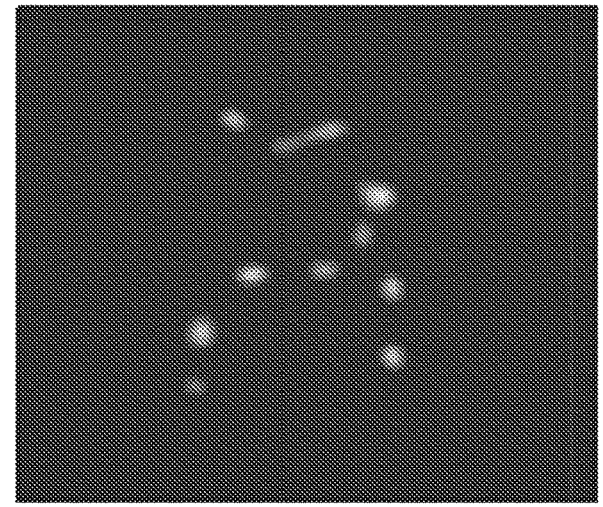
Figure 2F:
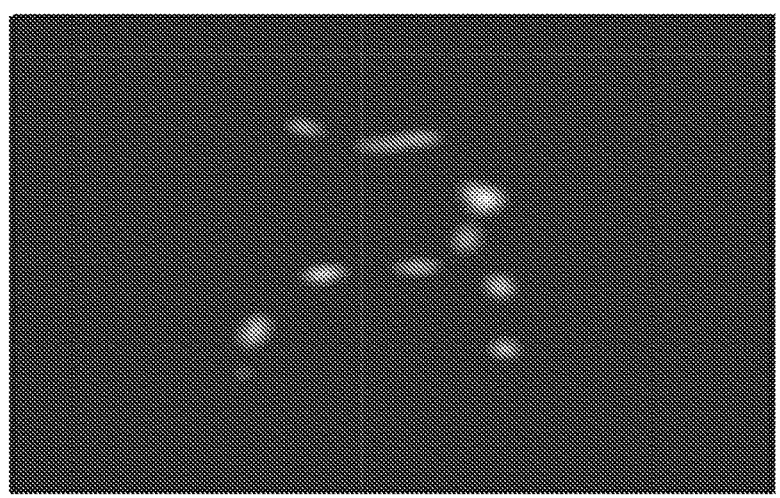

FIGS. 2B through 2F show simulated optical images and images with reconstruction results from scan featuring a 50 nm step size and 100 ms pixel dwell time. FIG. 2B shows an ISM image. The gray ramp in FIG. 2B represents detected photon counts. FIG. 2C shows a Q-ISM image. The gray ramp in FIG. 2C represents the number of missing detected photon pairs, with a scale bar of 0.25 μm. FIG. 2D shows the emitter positions obtained via sparse reconstruction (SR) of the ISM image, and FIG. 2E shows the SR using the Q-ISM image. The parameters used for FIG. 2D are λ=0.5, and for FIG. 2E are λ=0.1. FIG. 2F shows a joint sparse reconstruction (JSR) image. The parameters used for FIG. 2F are η=6, λ=0.3.

In some embodiments, the simulation may be based on a confocal scan of point single photon emitters, which mimics the experimental scan process. For example, the simulation implementation may be written using the MATLAB® programming language. The scan dimensions may be 1 μm×1 μm with step size of 50 nm, pixel dwell time of 100 ms and a 5 MHz laser repetition. The excitation and detection PSFs width may be 150 nm. The magnification of the microscope may be ×748, and the detectors at the imaging plane may be at the same formation and size as in lab conditions. The detection and/or emission probabilities may be 0.05 and 0.25 respectively. In every scan step, the detected number of photons each detector may be drawn from a Poisson distribution (e.g., using the "poissrnd" function in MATLAB®), with the expectation value calculated using the scan parameters. In a similar manner, the number of simultaneous photon pairs may be estimated, as well as the number of pairs that arrive at different times. In some embodiments, the post processing of the simulated data may be similar to the experimental process.

Figure 2G:
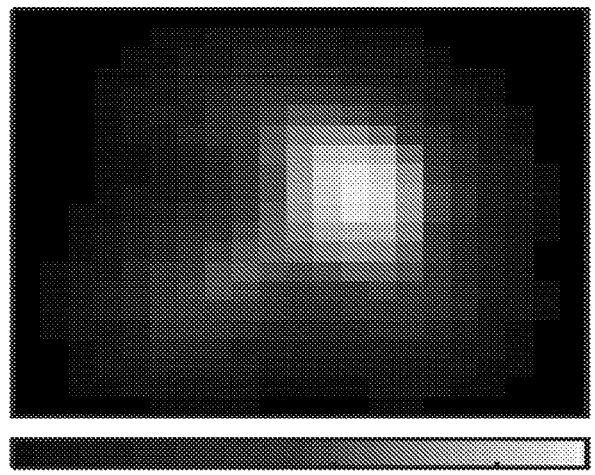
Figure 2H:
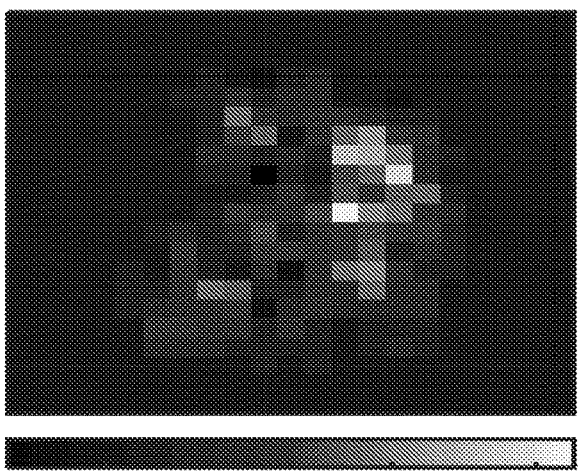

FIGS. 2G through 2K show simulated optical images and images with reconstruction results from scan featuring a 50 nm step size and with a different 10 ms pixel dwell time. These results represent a lower signal and hence a lower SNR for both ISM and Q-ISM. As seen in FIGS. 2G and 2H, the effect of the shorter integration time is only significant for the noisier Q-ISM image.

Figure 2I:
Figure 2J:
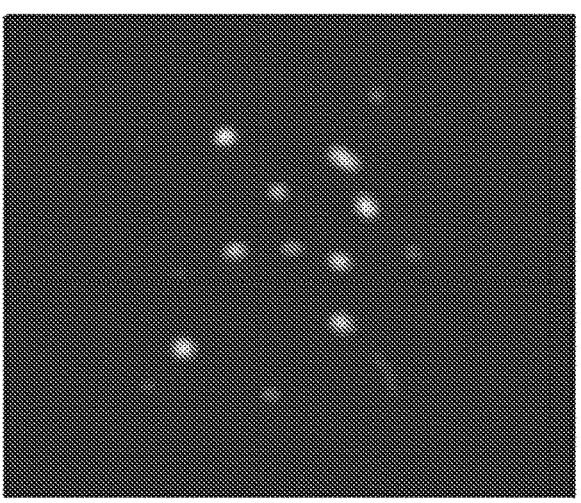
Figure 2K:
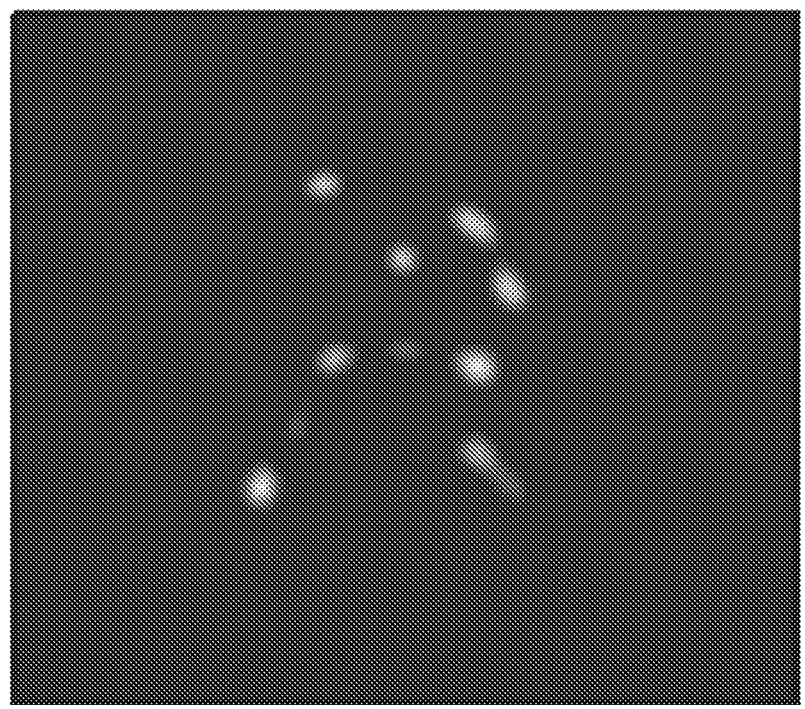

FIG. 2G shows an ISM image, in which the gray ramp represents detected photon counts. FIG. 2H shows a Q-ISM image, in which the gray ramp represents the number of missing detected photon pairs, with a scale bar of 0.25 μm. FIG. 2I shows emitter positions obtained via SR of the ISM image, and FIG. 2J shows the SR using the Q-ISM image. The parameters used for FIG. 2I are λ=0.5, and the parameters used for FIG. 2J are λ=0.1. FIG. 2K shows a joint sparse reconstruction (JSR) image. The parameters used for FIG. 2K are η=4, λ=0.3.

The first scan produced a reasonable Q-ISM image with SNR~6, at the brightest pixels (shown in FIG. 2C), while the second scan created a noisy image with SNR~2, at most (shown in FIG. 2H). It should be noted that shot noise in Q-ISM is associated with the signal being the difference between two relatively large numbers. Regarding ISM, the photon count level may be sufficiently high, and hence the two versions may not exhibit any discernable difference, as shown in FIG. 2B and FIG. 2G.

It should be noted that no Fourier reweighting was applied to the raw image prior to the algorithmic reconstruction. Thus, the Q-ISM features a $\sqrt{2}$ improvement in resolution over ISM. Thereupon, each data set was processed separately in FIGS. 2B through 2C and FIGS. 2G through 2H.

A single measurement vector (SMV) sparse recovery algorithm is implemented according to equation (1), on each of the simulated images: ISM SR (in FIG. 2D and FIG. 2I) and Q-ISM SR (in FIG. 2E and FIG. 2J).

Finally, the solutions to the JSR problem in Eq. (2) are shown in FIG. 2F and FIG. 2K. The free parameters λ and η were tuned empirically. For consistency, all recovered images were smoothened with the same narrow Gaussian kernel that was used for the ground truth image (shown in FIG. 2A).

Visually comparing the FIGS. 2B through 2F, it may be possible to observe that when the correlation signal is sufficiently high, its exclusive reconstruction outperforms the intensity based one. Although not perfectly matching the ground truth image (shown in FIG. 2A), especially in terms of localizing the emitters, it is able to reveal finer features which are missing in the pure intensity method. Nonetheless, the joint method greatly resembles the correlation-based reconstruction. In that case, the intensity image may be redundant and hold no added value that may assist the algorithm.

Visually comparing the FIGS. 2G through 2K, it may be possible to observe that the correlation signal is rather low. It results in a degraded reconstruction, principally due to noise being erroneously interpreted as emitters. Strikingly, however, reconstruction according to the joint method eliminates these false positives, while preserving the finer details of the ground truth to a considerable extent. Put in a different way, the joint approach may be capable of taking advantage of the information existing in a better resolved yet noisy image, and enhance the low resolution image reconstruction.

It should be noted that as the SNR of correlation image may be further decreased, its relative proportion in the data fidelity term in Eq. (1) needs to be diminished and consequently JSR reduces to the intensity reconstruction. Thus, adjustment of the relative weight may guarantee that the incorporation of the noisy image may only boost the reconstruction process, and not deteriorate it.

In some embodiments, the algorithmic fusion may facilitate a drastic reduction in the requisite measurement duration since low SNR Q-ISM measurements suffice for augmenting ISM images. Through the application of JSR algorithm to the measurements, the resolution may be enhanced, and a solid estimate of the emitter density may be provided, while processing occurred with a substantial reduction in the image acquisition time.

Reference is made to FIGS. 3A through 3I which show experimental results of correlative scanning electron microscope (SEM) measurements and sparse reconstructions, according to some embodiments of the presently disclosed subject matter. In these figures, JSR is demonstrated on experimental Q-ISM and ISM data, which include imperfections such as fluctuations and inaccurate knowledge of the point spread function (PSF). The sample was prepared by drop-casting a diluted solution of quantum dots onto a marked glass coverslip, and allowed to dry. Following the optical scans, the sample was measured with a scanning electron microscope (e.g., SEM Sigma), whose resolution was sufficient to separate individual quantum dots. Thus, the SEM measurements played the role of a ground truth (or reference) measurement. The results in FIGS. 3A through 3I compare the optical images, analyzed from a scan of cluster of quantum dots, their computational reconstructions and the matching SEM image.

In some embodiments, the sample may be prepared by dispersing a solution of quantum dots diluted in Ethanol, onto a gridded coverslip, and allowing to dry. The scans may be performed in 50 nm steps with a 5 MHz laser repetition rate, 100 ms pixel dwell time and a power of 1.5 μW. Following the optical measurements, the sample was coated with a 3 nm layer of carbon. Shorter acquisition may be obtained by post processing segmentation of the data.

According to some embodiments, the joint sparse reconstruction (JSR) may generally be applied to two images with a common support. An image f of size M×M measured on a Cartesian grid with spacing $\Delta_L$ may be represented as a sum over R emitters.

$$f[m\Delta_L, n\Delta_L] = \sum_{k=0}^{R-1} u[m\Delta_L - m_k, n\Delta_L - n_k]x_k, \quad \text{Eq. (3)}$$

where $u[m\Delta_L, n\Delta_L]$, m, n=[0, ..., M−1] is the sampled PSF, $x_k$ is the intensity of emitter k, and $m_k$, $n_k$ represent the location of the emitter on the grid. The PSF of the system may be assumed to be known or estimated from a calibration measurement. The reconstruction of the emitters' positions takes place on a high-resolution grid with spacing $$\Delta_H = \frac{\Delta_L}{P},$$

with some integer P≥1. The particles' positions may be expressed as $[m_k, n_k]=[j_k, l_k]\Delta_H$ for some integers $j_k$, $l_k$=0, ..., N−1, where N=PM. In addition, a double summation may be used to describe the possible coordinates of the particles on the denser grid. If the algorithm detects an emitter at position $[j_k, l_k]$, it places its estimated amplitude $x_{ij}$ at that position. Otherwise the value of $x_{jl}$ is set to zero, recalling there are only R active emitters. Omitting $\Delta_H$, Eq. (3) may be written in the Fourier domain in the compact form $$f[mP, nP] = \sum_{j=0}^{N-1} \sum_{l=0}^{N-1} u[mP - j, nP - l]x_{jl}, \quad \text{Eq. (4)}$$

A two-dimensional M×M discrete Fourier transform (DFT) on Eq. 4, may be defined as:

$$F[k_m, k_n] = U[k_m, k_n]\sum_{j=0}^{N-1}\sum_{l=0}^{N-1} e^{-i\frac{2\pi}{N}k_m j}e^{-i\frac{2\pi}{N}k_n l}x_{jl} \quad \text{Eq. (5)}$$

with $U[k_m, k_n], k_m, k_n=0, \ldots, M-1$ the M×M DFT of the discretized PSF.

The column-wise stacking of $F[k_m, k_n]$ may be denoted as a length $M^2$ vector y, and similarly let x represent the length $N^2$ vector stacking of $x_{ij}$. In addition, H and A may be defined as H=diag {U[0,0], ..., U[M−1, M−1]}, and A=H($F_M \otimes F_M$), $\otimes$ being the Kronecker multiplication operator, and $F_M$ is a partial M×N DFT matrix which includes of the first M rows of the full N×N DFT matrix. With this notation, Eq. (5) may be compactly expressed as:

$$y = Ax, A \in \mathbb{C}^{M^2 \times N^2} \quad \text{Eq. (6)}$$

Eq. (6) may be the basis for the data fidelity terms of the two images that appear in the optimization problem in Eq. (2) that may be rewritten in the following way:

$$\min_{x_1, x_2} \{f_1(x_1) + f_2(x_2) + \lambda(\|x_1\|_1 + \|x_2\|_1)\} \quad \text{Eq. (7)}$$

with $$f_1(x) = \frac{1}{2}\frac{1}{\sqrt{1+\eta^2}}\|A_1 x - y_1\|_F^2, f_2(x) = \frac{1}{2}\frac{\eta}{\sqrt{1+\eta^2}}\|A_2 x - y_2\|_F^2 \quad \text{Eq. (8)}$$

Eq. (7) may be solved iteratively utilizing the FISTA algorithm with computation of the gradients in Eq. (8) resulting in:

$$\nabla f_1(x) = \frac{1}{\sqrt{1+\eta^2}}A_1^\dagger(A_1 x - y_1), \nabla f_2(x) = \frac{\eta}{\sqrt{1+\eta^2}}A_2^\dagger(A_2 x - y_2) \quad \text{Eq. (9)}$$

The structure of matrices $A_1$, $A_2$ in the Fourier domain enables an efficient implementation of Eq. (9) using FFT and inverse FFT operations only, which may have a computational complexity of nlog(n), where n is the length of the vector over which the FFT is applied. In this algorithm, $L_1, L_2$ are the Lipschitz constants of equation (9), and equal to the maximum eigenvalue of $$\frac{1}{\sqrt{1+\eta^2}}A_1^\dagger A_1 \text{ and } \frac{\eta}{\sqrt{1+\eta^2}}A_2^\dagger A_2$$

respectively.

Figure 3A:
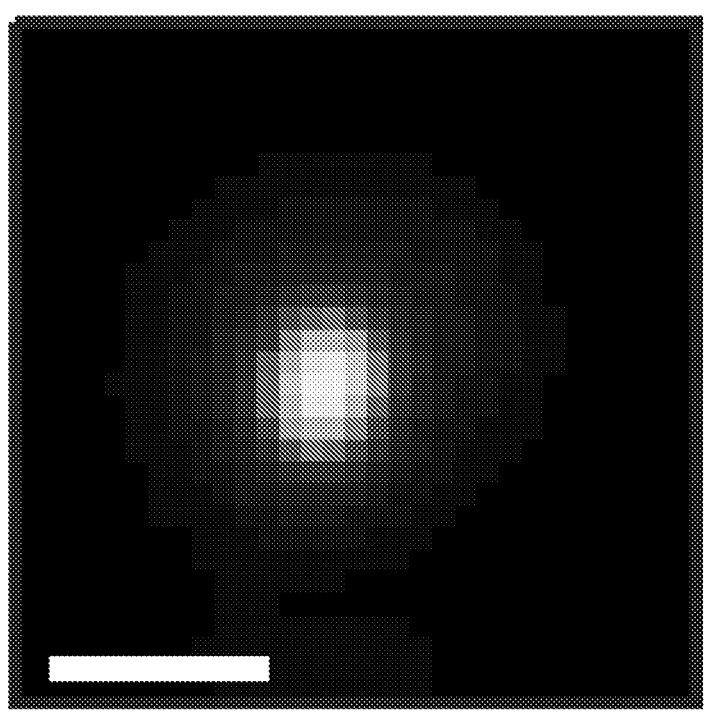
FIGS. 3A through 3I show experimental results of correlative scanning electron microscope (SEM) measurements and sparse reconstructions, according to some embodiments of the presently disclosed subject matter.
Figure 3A:
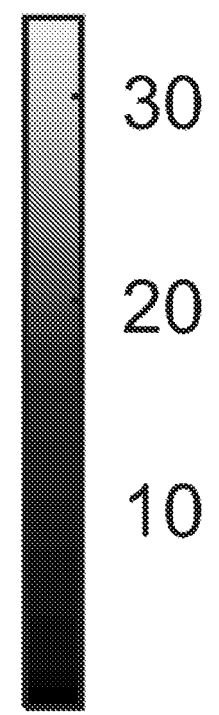
Figure 3B:
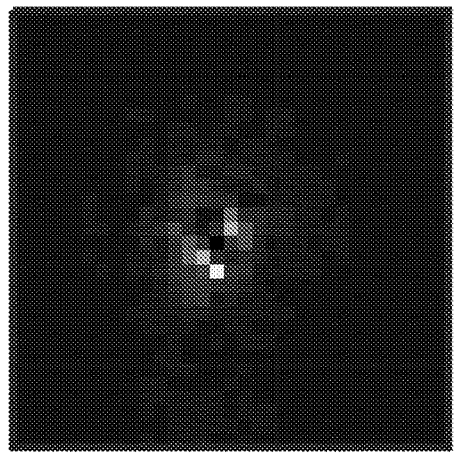

FIGS. 3A through 3B show images processed from a 1.5 μm×1.5 μm confocal scan (50 nm, 10 ms pixel dwell time) of cluster of fluorescent quantum dots, in which the Q-ISM image featured SNR~2. FIG. 3A shows an ISM image, with the gray ramp representing the number of detected photons. FIG. 3B shows a Q-ISM image, with the gray ramp representing detected missing photon pairs. The pixel reassignment procedure may be carried out using a calibration measurement of a single particle, much smaller than the laser beam PSF. The calibration scan may also provide knowledge of the ISM and Q-ISM PSFs (e.g., fitted with two dimensional Gaussians), for instance required for the reconstruction process.

Figure 3C:
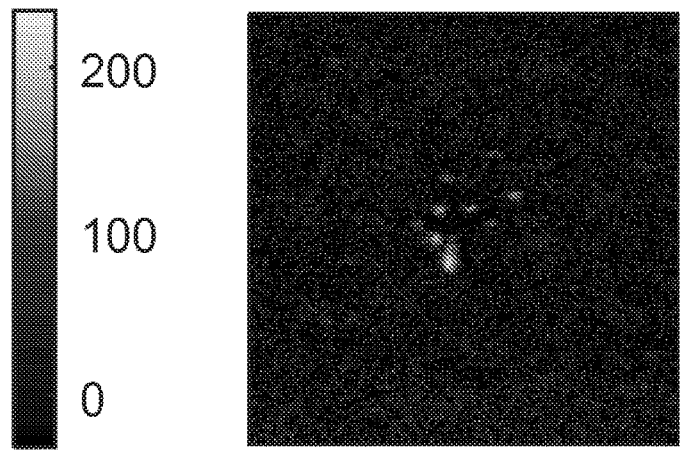

FIG. 3C shows a SEM measurement image of the same cluster that was optically measured. Using the markings on the glass, since the sample was prepared by drop-casting a diluted solution of quantum dots onto a marked glass coverslip, it may be possible to locate and scan the same scene utilizing the SEM measurement.

Figure 3D:
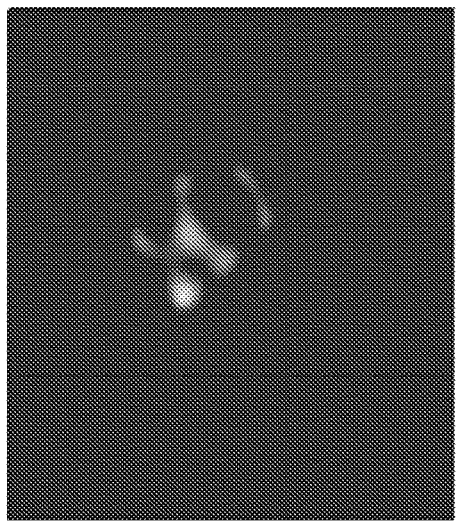
Figure 3E:
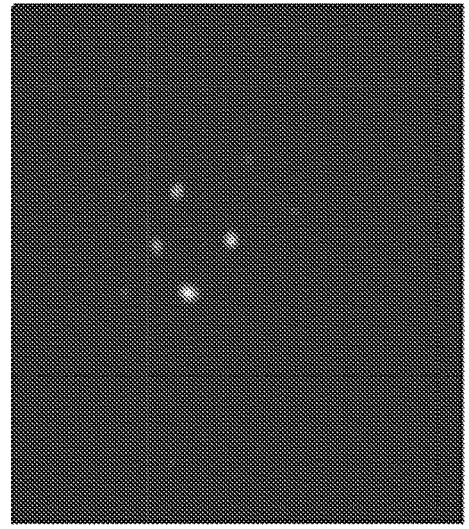
Figure 3F:
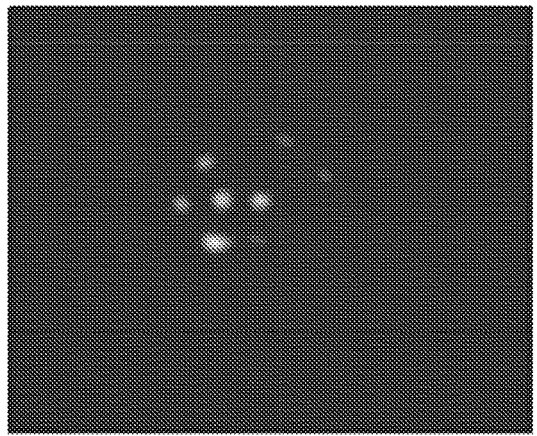

Analogously to the simulation results, three possible algorithmic reconstructions of the scene, with an ISM SR image, a Q-ISM SR image and JSR image, are presented in FIGS. 3D through 3F respectively. FIG. 3D shows SMV reconstructions, with an ISM SR image. The parameters used for FIG. 3D are $\lambda=0.2$. FIG. 3E shows a Q-ISM SR image, and FIG. 3F shows a JSR image. The parameters used for FIG. 3E are $\lambda=0.04$, and the parameters used for FIG. 3F are $\eta=1$, $\lambda=0.2$. All of the recovered images may be smoothened with a narrow Gaussian PSF. For a clearer comparison, the SEM image was threshold to accentuate the locations of the particles, and superimposed over each of the reconstructions (as shown in FIGS. 3G through 3I).

Figure 3G:
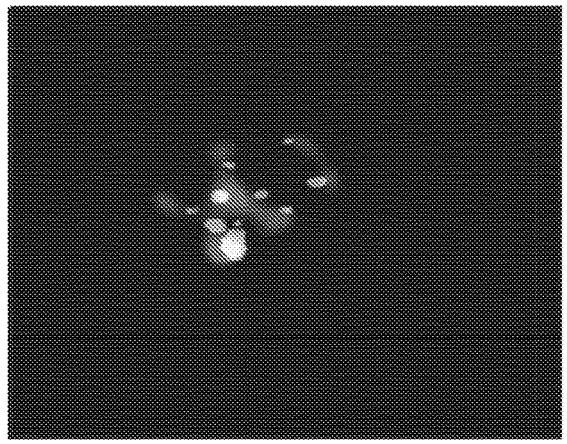
Figure 3H:
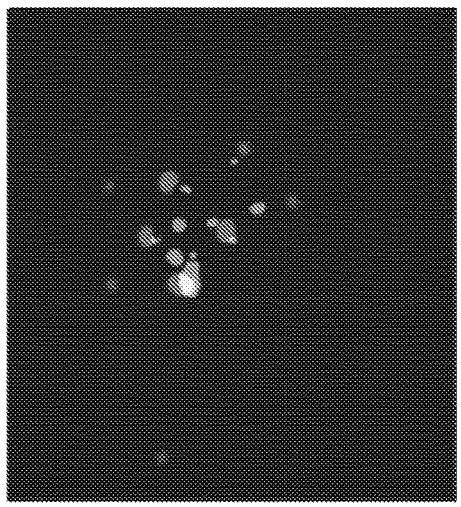
Figure 3I:
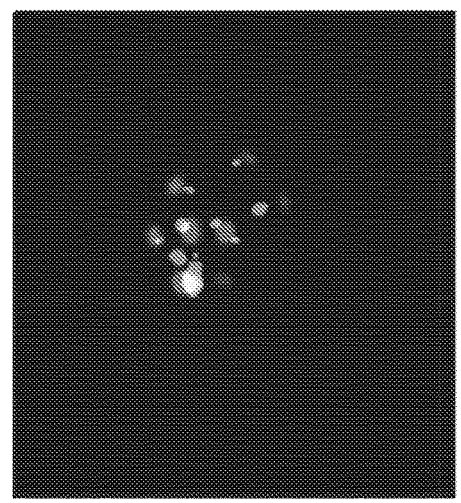

FIGS. 3G through 3I show filtered correlative SEM image overlaid with each of the reconstructions, where the scale bar of 0.5 µm. FIG. 3G shows an ISM SR image. FIG. 3H shows a Q-ISM SR image, and FIG. 3I shows a JSR image.

Visual inspection of FIGS. 3A through 3I may lead to the observation that JSR achieves a more accurate characterization of the scene than any of the single measurements, and which is in agreement with the ground truth (or reference) image. On the one hand, the separation between particles in JSR is more salient than the ISM SR, and in particular, more particles are resolved. On the other hand, compared to Q-ISM SR, JSR delivers again a more precise description of the scene, especially mitigating the emergence of spurious emitters, which evidently hamper the reliability of the former. In some embodiments, the SR and/or JSR reconstructions may be performed on a grid eight times finer than the input grid, using a thousand iterations.

According to some embodiments, sparse reconstructions may improve the resolution of the input image, under the condition that the image is sparse. Using only few emitters per diffraction limited spot, the resulting image is sparse in the real space domain. Notwithstanding, depending on the image, other sparse representations may also be used (e.g., discrete wavelet and/or cosine bases).

A simple joint sparse recovery algorithm may be thus demonstrated, with the algorithm merging the ISM and Q-ISM images. This may be achieved due to the concealed valuable information in Q-ISM acquired in an order of magnitude less time than needed for a moderate SNR image. With such experimental conditions, it may be possible to reduce the pixel dwell time to 10 ms, and still benefit from the advantages encompassed in the photon correlation measurement.

In some embodiments, the use of higher laser repetition rates with suitable markers that have short excited lifetimes, together with a high quantum yield and photostability at near-saturation excitation power, may also increase the signal level. In these circumstances it may be possible that pixel dwell time may be decreased to a one-millisecond scale.

In some embodiments, the correlation with the images from the SEM measurements may provide a ground truth (or reference) image to test the algorithm and/or determine the optimal parameters. However, in order establish the reliability of "blind" reconstructions of various types of scenes and experimental conditions, a suitable autonomous choice of the parameters may be required. In some embodiments, the optimization of parameters may be achieved through techniques from the field of machine learning, for instance training a machine learning algorithm to determine optimal parameters corresponding to the optimal achieved resolution.

It should be noted that at this stage the algorithm is supplied with only two complementary images, and their PSFs. Nevertheless, additional implicit information may be integrated into the algorithm. Knowledge of the intensity and/or second order correlation, may provide an estimation to the number of emitters in a certain area. Accordingly, the prior of the number of particles may be used to boost the performance of the algorithm. Additional routes to improve the reconstruction performance may include a better modelling of the noise, and combination with other types of regulators, such as $\ell_2$ regularizer.

In some embodiments, the joint recovery of a complementary images in terms of resolution and SNR, may be applied in super-resolution optical fluctuation imaging (SOFI) microscopy.

Figure 4:
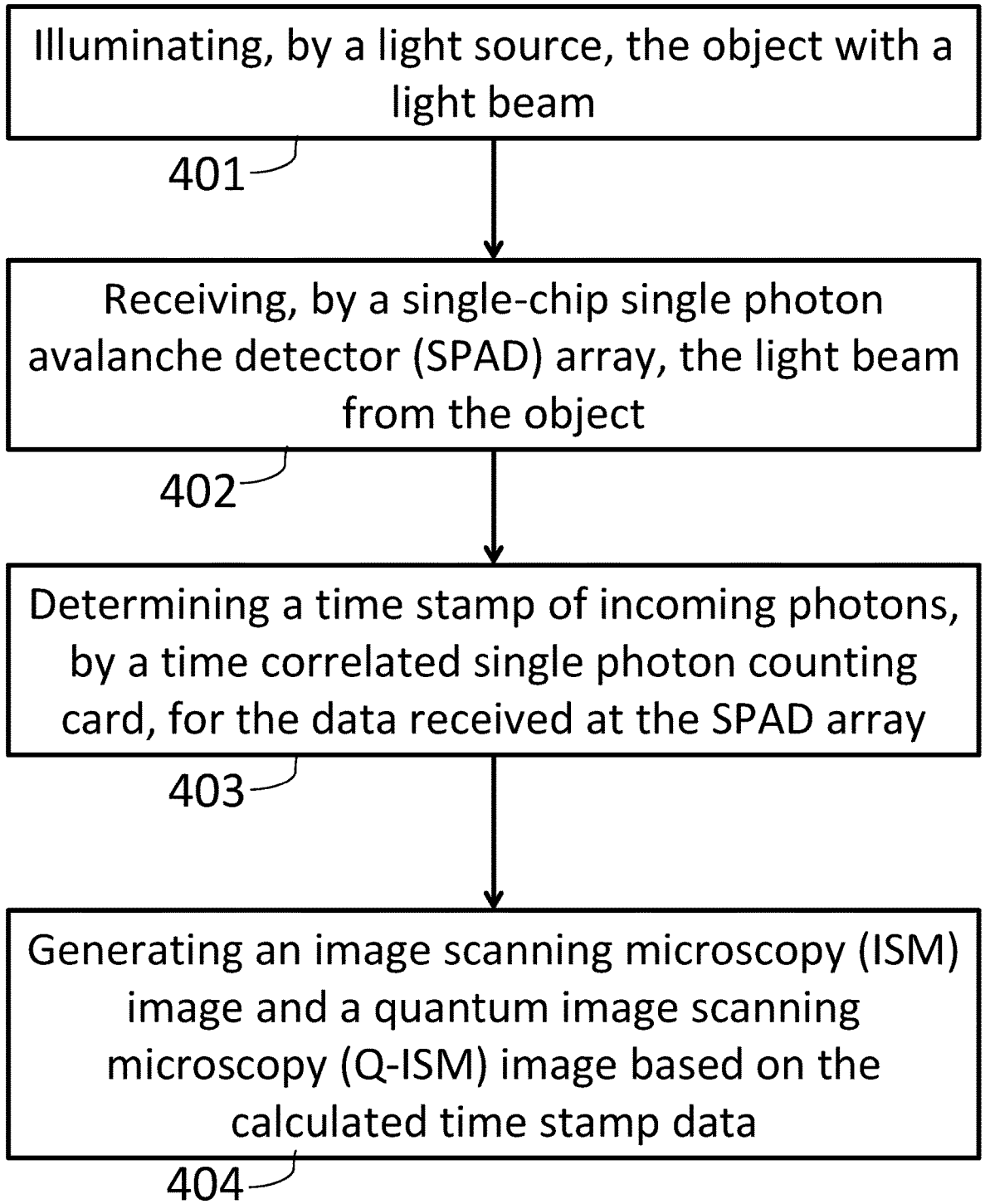
FIG. 4 shows a flow chart of a method of generating an image of an object based on photon correlation, according to some embodiments of the presently disclosed subject matter.

Reference is made to FIG. 4 which shows a flow chart of a method of generating an image of an object based on photon correlation, according to some embodiments of the presently disclosed subject matter. The sample or object may be illuminated by a light source (in Step 401).

The light beam from the object may be received by the single-chip single photon avalanche detector (SPAD) array (in Step 402). In some embodiments, a time stamp of incoming photons may be determined by a time correlated single photon counting (TCSPC) card (in Step 403). Accordingly, an image scanning microscopy (ISM) image and a quantum image scanning microscopy (Q-ISM) image may be generated based on the calculated time stamp data (in Step 404). In some embodiments, the generated ISM and Q-ISM images may be combined using joint sparse reconstruction (JSR) algorithm.

According to some embodiments, JSR may be performed on the intensity and correlation images directly, without first generating intermediate ISM and Q-ISM images as described above. Such a JSR may comprise determining a solution to a modified version of Eq. (2), e.g., as follows:

$$\min_{x'_i, x''_j} \left\{ \sum_{i=1}^{U} \|A'_i x'_i - y'_i\|_2^2 + \sum_{j=1}^{V} \eta \|A''_j x''_j - y''_j\|_2^2 + \lambda \|\hat{X}\|_{2,1} \right\}, \quad \text{Eq. (10)}$$

in which U is the number of intensity images, $A'_i$ is the sensing matrix of each detector, $x'_i$ is a vector of the signal, for example a latent signal, of each of the intensity images, $y'_i$ is the measurement vector associated with each of the intensity images, V is the number of correlation images, $A''_j$ is the sensing matrix of each of the pairs of detectors, $x''_j$ is a vector of the signal, for example a latent signal, of each of the correlation images, $y''_j$ is the measurement vector associated with each of the correlation images, and $\hat{X}$ is a matrix constituted by stacking all of the x' and x" vectors (e.g., each of the vectors constitutes a column in the matrix $\hat{X}$). Similar to Eq. (2), $\eta$ is a weighting factor, i.e., a scalar that controls the relative contribution of the intensity and correlation images, $\|\cdot\|_2$ denotes the $\ell_2$ norm, $\|\cdot\|_{2,1}$ denotes the $\ell_{2,1}$ mixed norm to promote sparsity, and $\lambda$ is a regularization parameter of the $\ell_{2,1}$ norm.

It will be appreciated that the JSR may be performed by generating an intermediate ISM image from the intensity images by any method, and performing JSR using the intermediate ISM image and the correlation images. Similarly, an intermediate Q-ISM image may be generated from the correlation images by any method, and JSR may be performed using the intermediate Q-ISM image and the intensity images. Intermediate images may be generated using sparse recovery, pixel reassignment, or any other suitable method or combination of methods.

It will be appreciated that while the presently disclosed subject matter is directed toward emitters which exhibit quantum fluctuations, for example owing to antibunching effects, this is for explanatory purposes only, and applications wherein the emitters exhibit classical (i.e., non-quantum) fluctuations could be imaged by the same systems and methods without departing from the scope of the presently disclosed subject matter, mutatis mutandis.

Unless explicitly stated, the method embodiments described herein are not constrained to any particular order in time or chronological sequence. Additionally, some of the described method elements may be skipped, or they may be repeated, during a sequence of operations of a method.

Those skilled in the art to which this invention pertains will readily appreciate that numerous changes, variations, and modifications can be made without departing from the scope of the presently disclosed subject matter, mutatis mutandis.

The invention claimed is:

1. A method of generating an image of a sample exhibiting non-Poissonian emission statistics, the method comprising:
    providing a plurality of photon detectors;
    scanning the sample with an excitation beam over a pre-determined time period;
    receiving, by said detectors, photons emitted by the sample due to the excitation during said time period;
    generating a plurality of intensity images associated with each of said detectors, each of said intensity images being proportional to the mean number of photons detected per unit time;
    generating a plurality of correlation images associated with each combination of two of said detectors, each of said correlation images being proportional to the variance of the distribution of detected photons per unit time; and
    generating the image of said sample using joint sparse recovery from said plurality of intensity and correlation images, wherein said intensity and correlation images have common support.

2. The method according to claim 1, wherein said joint sparse recovery comprises determining a solution to:

$$\min_{x'_i, x''_j} \left\{ \sum_{i=1}^{U} \|A'_i x'_i - y'_i\|_2^2 + \sum_{j=1}^{V} \eta \|A''_j x''_j - y''_j\|_2^2 + \lambda \|\hat{X}\|_{2,1} \right\},$$

wherein:
    U is the number of intensity images;
    V is the number of correlation images;
    $A'_i$ is the sensing matrix of each detector;
    $A''_j$ is the sensing matrix of each of the pairs of detectors;
    $x'_i$ is a vector of the signal, for example a latent signal, of each of the intensity images;
    $x''_j$ is a vector of the signal, for example a latent signal, of each of the correlation images;
    $y'_i$ is the measurement vector associated with each of the intensity images;
    $y''_j$ is the measurement vector associated with each of the correlation images;
    $\hat{X}$ is a matrix constituted by stacking all of the x' and x" vectors;
    η is a weighting factor;
    $\|\cdot\|_2$ denotes the $\ell_2$ norm;
    $\|\cdot\|_{2,1}$ denotes the $\ell_{2,1}$ mixed norm to promote sparsity; and
    λ is a regularization parameter of the $\ell_{2,1}$ norm.

3. The method according to claim 1, further comprising:
    generating an intermediate image from said plurality of intensity images; and/or
    generating an intermediate image from said plurality of correlation images;
    wherein said joint sparse recovery is performed using the intermediate image or images.

4. The method according to claim 3, wherein at least one of the intermediate image or images is generated using pixel reassignment and/or sparse recovery.

5. The method according to claim 1, wherein generating each of the correlation images comprises determining the difference between the number of pairs of photons detected by the two detectors at a non-zero, finite delay and the number of pairs of photons detected by the two detectors at a zero delay.

6. The method according to claim 1, wherein said sample exhibits quantum intensity fluctuations.

7. The method according to claim 4, wherein said quantum intensity fluctuations comprises photon antibunching.

8. The method according to claim 1, wherein said sample exhibits classical intensity fluctuations.

9. The method according to claim 1, wherein the number of intensity images is equal to the number of detectors.

10. The method according to claim 1, wherein the number of correlation images is equal to the number of combinations of pairs of detectors.

11. A system for generating an image of a sample exhibiting non-Poissonian emission statistics, the system comprising:
    a light source configured to scan the sample with an excitation source;
    a collection array comprising a plurality of photon collectors each configured to receive photons emitted by the sample due to excitation by the excitation source;
    a detector assembly comprising a plurality of detectors each corresponding to one of said photon collectors, the detector assembly being configured to measure the arrival time of the collected photons; and
    a computing device configured to:
        generate a plurality of intensity images associated with each of said detectors, each of said intensity images being proportional to the mean number of photons detected per unit time;
        generate a plurality of correlation images associated with each combination of two of said detectors, each of said correlation images being proportional to the variance of the distribution of detected photons per unit time; and
        generating the image of said sample using joint sparse recovery from said plurality of intensity and correlation images, wherein said intensity and correlation images have common support.

12. The system according to claim 11, wherein said detector assembly comprises a single photon avalanche detector array and a time correlated single photon counting card in communication with the single photon avalanche detector array.

13. The system according to claim 11, further comprising a dichroic mirror and at least one lens.

14. The system according to claim 11, wherein the collection array comprises a bundle of fiber-optic cables.

15. The system according to claim 11, wherein said joint sparse recovery comprises determining a solution to:

$$\min_{x'_i, x''_j} \left\{ \sum_{i=1}^{U} \|A'_i x'_i - y'_i\|_2^2 + \sum_{j=1}^{V} \eta \|A''_j x''_j - y''_j\|_2^2 + \lambda \|\hat{X}\|_{2,1} \right\},$$

wherein:
- U is the number of intensity images;
- V is the number of correlation images;
- $A'_i$ is the sensing matrix of each detector;
- $A''_j$ is the sensing matrix of each of the pairs of detectors;
- $x'_i$ is a vector of the signal, for example a latent signal, of each of the intensity images;
- $x''_j$ is a vector of the signal, for example a latent signal, of each of the correlation images;
- $y'_i$ is the measurement vector associated with each of the intensity images;
- $y''_j$ is the measurement vector associated with each of the correlation images;
- $\hat{X}$ is a matrix constituted by stacking all of the x' and x" vectors;
- $\eta$ is a weighting factor;
- $\|\cdot\|_2$ denotes the $\ell_2$ norm;
- $\|\cdot\|_{2,1}$ denotes the $\ell_{2,1}$ mixed norm to promote sparsity; and
- $\lambda$ is a regularization parameter of the $\ell_{2,1}$ norm.

16. The system according to claim 11, wherein the computing device is further configured to:
- generate an intermediate image using sparse recovery from said plurality of intensity images; and/or
- generate an intermediate image using sparse recovery from said plurality of correlation images;

wherein said joint sparse recovery is performed using the intermediate image or images.

17. The system according to claim 16, wherein the computing device is configured to generate at least one of the intermediate images using pixel reassignment and/or sparse recovery.

18. The system according to claim 11, wherein generating each of the correlation images comprises determining the difference between the number of pairs of photons detected by the two detectors at a non-zero, finite delay and the number of pairs of photons detected by the two detectors at a zero delay.

19. The system according to claim 11, wherein the number of intensity images is equal to the number of detectors.

20. The system according to claim 11, wherein the number of correlation images is equal to the number of combinations of pairs of detectors.

* * * * *